Feb. 10, 1970  M. H. VOELKER  3,494,173
METHOD AND APPARATUS FOR TESTING PRINTING
PAPER FOR BLISTERING
Filed Oct. 20, 1967  2 Sheets-Sheet 1
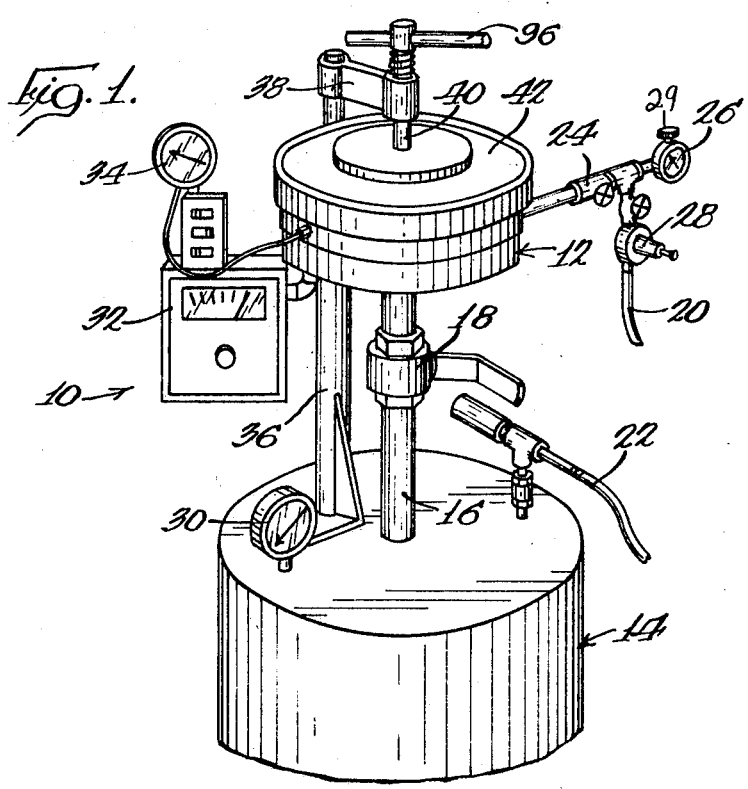
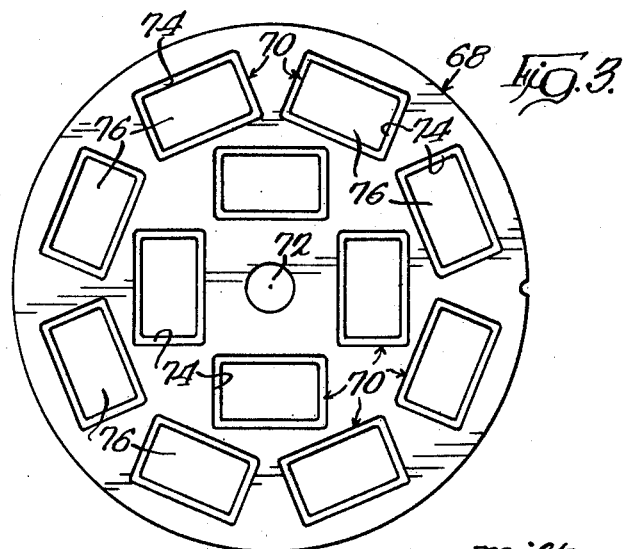
Inventor
Milton H. Voelker
By
Gary, Parker, Juettner & Cullinan
Attys

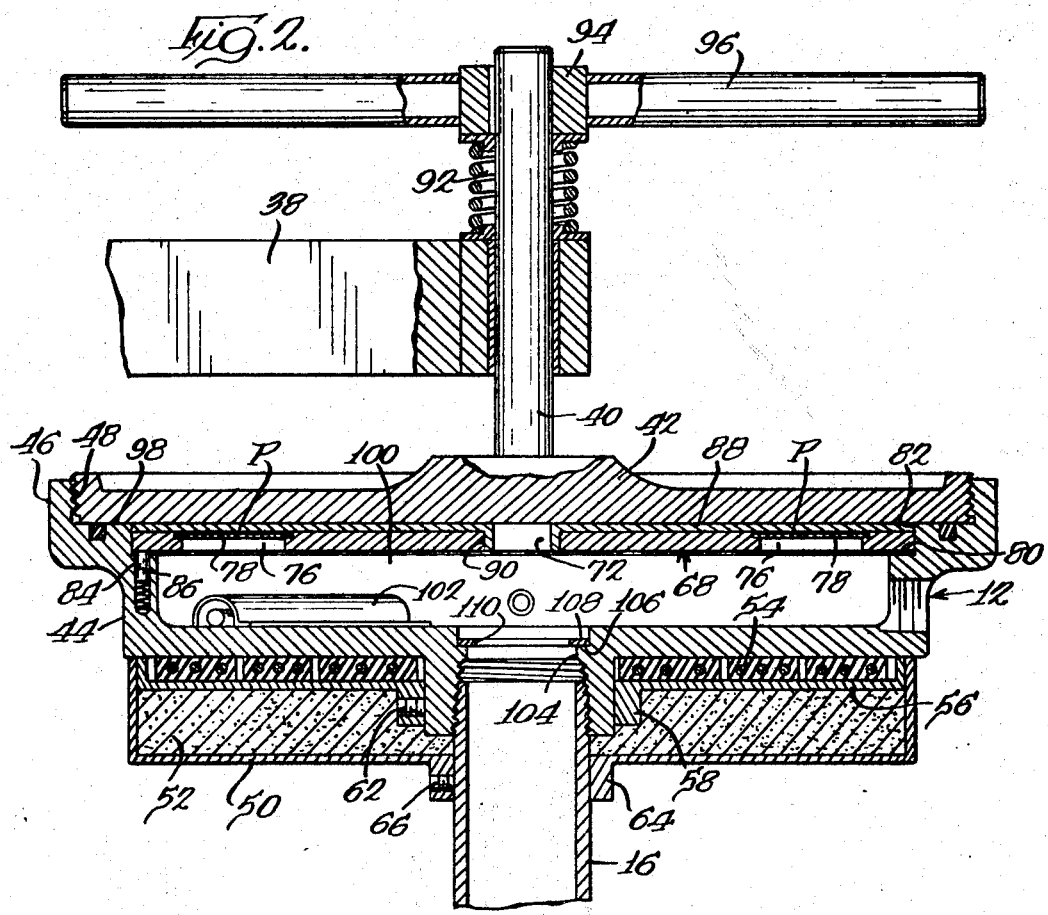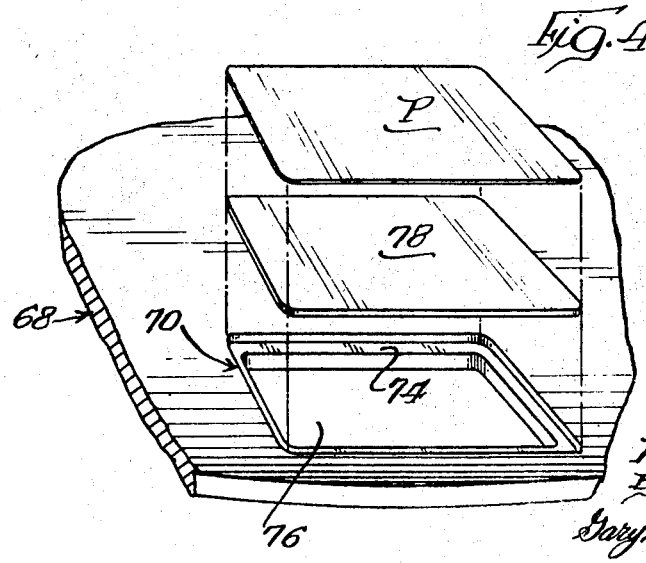

United States Patent Office 3,494,173
Patented Feb. 10, 1970

3,494,173
METHOD AND APPARATUS FOR TESTING PRINTING PAPER FOR BLISTERING
Milton H. Voelker, Wisconsin Rapids, Wis., assignor to Consolidated Papers, Inc., Wisconsin Rapids, Wis., a corporation of Wisconsin
Filed Oct. 20, 1967, Ser. No. 680,293
Int. Cl. G01n 25/00
U.S. Cl. 73—15          14 Claims

ABSTRACT OF THE DISCLOSURE

A method and apparatus for testing printing paper for blistering by inking a paper sample, heating a sample of the paper at a pressure above the equilibrium vapor pressure of moisture in the sample, and then reducing the pressure to a value below the equilibrium vapor pressure of the moisture causing moisture in the sample to evaporate rapidly thereby producing a condition which tends to cause blistering of the sample.

Brief summary of the invention

In paper printing operations the paper is printed with ink and is thereafter subjected to intense heat in ink-drying ovens. The ink-drying operation causes any moisture in the paper to be converted into steam, and where the steam cannot readily escape to the atmosphere through the pores of the paper it will tend to rupture the paper and produce a blister. Such blistering is usually more pronounced in areas with heavy ink coverage, since the ink tends to act as a seal and close up the pores of the paper thereby eliminating a ready avenue of escape for the steam. Consistent with the foregoing theory of blistering, I have found that blistering is more prevalent in paper sheets of low porosity and also in sheets having relatively low internal bonding strength.

It is important to have available a method and apparatus which permits testing in a laboratory or otherwise to determine whether or not a given type of paper is prone to blistering. Such testing is important for purposes of quality control, and also is most helpful in carrying on experimental work to vary the physical characteristics of printing paper in an attempt to eliminate blistering during an ink-drying operation. Certain methods and apparatus have previously been developed for testing the degree to which paper samples are subject to blistering. However, such known methods and apparatus have not been entirely satisfactory, due primarily to a failure to consistently obtain results which correlate closely with results obtained in the print shop, at least with respect to certain types of papers.

One known form of method and apparatus for blister testing of paper samples is described in U.S. Patent 3,292,418, which issued Dec. 20, 1966 and is assigned to the assignee of the instant application. The apparatus described in the foregoing patent comprises a pair of infrared heat lamps, and the specimen is positioned between the two lamps and heated until a blister appears. The time required to initiate blistering is recorded as an indication of the degree to which the paper is prone to blistering. For example, a sample specimen of paper is placed in a special holder and inked on both sides. The specimen is then dried between two infrared heat lamps placed approximately one inch apart. Both of the lamps and an automatic timer are actuated when the specimen is placed in a special guide between the lamps. As soon as blistering appears, the sheet is removed, and such removal stops the automatic timer and records the heating time required to develop a blister. The blistering time is then taken and an indication of blistering tendency, i.e., a longer heating time indicates increased blister resistance.

It is a general object of the present invention to provide an improved method and apparatus for testing printing paper for blistering which are capable of producing results which correlate more closely with results obtained through commercial experience in the print shop and which are accurate over a wider range of blistering tendencies and processing variables than has heretofore been possible.

Another object of the invention is to provide a method and apparatus as above-mentioned where a sample of paper used in the test is not damaged except insofar as blistering occurs, thereby facilitating subsequent quantitative analysis of the sample with respect to the degree of blistering produced.

A more specific object of the invention is to provide a method and apparatus as last above-mentioned which involves heating a sample of test paper at a pressure above the equilibrium vapor pressure of moisture in the sample and then suddenly reducing such pressure to a value below the equilibrium vapor pressure thereby causing substantially all of the moisture in the sample to evaporate rapidly.

The foregoing and other objects and advantages of the invention will be apparent from the following description of a preferred embodiment thereof, taken in conjunction with the accompanying drawings.

Description of the drawings

FIGURE 1 is a fragmentary perspective view of blister testing apparatus constructed in accordance with the present invention;

FIGURE 2 is an enlarged vertical sectional view, partly brokn away, showing a portion of the test apparatus of FIGURE 1;

FIGURE 3 is a top plan view of a sample holder which comprises one component of the apparatus of FIGURE 1, there being shown in the sample holder a plurality of recesses each of which is intended to retain a paper sample to be tested; and FIGURE 4 is a fragmentary exploded view showing the manner in which a piece of moistened filter paper is first placed in one of the recesses formed in the sample holder of FIGURE 3, and a paper test sample is then placed in the recess so as to overlie the filter paper.

Now, in order to acquaint those skilled in the art with the manner of making and using my invention, I shall describe, in conjunction with the accompanying drawings, certain preferred embodiments of the invention.

Detailed description of the invention

Referring now to the drawings, FIGURE 1 shows blister test apparatus 10 comprising a pressure vessel 12, a vacuum tank 14, a conduit 16 connecting the pressure vessel to the vacuum tank, a quick-opening valve 18 positioned in the conduit 16, a compressed air inlet 20 leading to the pressure vessel 12, and a line 22 leading from the vacuum tank 14 to an aspirator (not shown) which serves to produce a desired vacuum in the tank 14. An air inlet valve 24 is provided in the line 20, and a pressure gage 26 and reducing valve 28 are also located therein. There is also provided a valve 29 located adjacent the pressure gage 26, the valve 29 being opened to break the vacuum in the system after completion of a test.

A vacuum gage 30 is mounted on the tank 14 to measure the vacuum pressure therein, and a temperature indicator and control member 32 and a temperature indicator 34 are operatively connected with the pressure vessel 12. In the embodiment being described, the pressure vessel 12 is supported above the vacuum tank 14 by the conduit 16 which comprises a rigid section of pipe. In addition, a supporting column 36 extends upwardly from the top of the vacuum tank 14 and at its upper end carries a pivotally mounted horizontal arm 38. A vertical support rod 40 is threaded through the end of the arm 38 and, as best shown in FIGURE 2, the lower end of the rod 40 carries a top cover plate 42 for the pressure vessel 12.

The temperature indicator and control member 32 serves to control and measure the temperature of the inside metal surface of the pressure chamber 12, while the temperature indicator 34 serves to indicate the temperature of the atmosphere within the pressure chamber 12. Electrical heating elements 54 are controlled by the temperature of the inside metal surface of the chamber 12 rather than by the temperature of the atmosphere within the pressure chamber, and the temperature of the metal surface is controlled at a pre-set level which will produce the desired temperature conditions within the chamber 12, e.g., 180 to 190 degrees F. It will be understood that the atmosphere within the pressure chamber 12 heats at a substantially slower rate than the metal shell of the chamber. Consequently, the metal shell would overheat and there would be cycling and wide variations in chamber temperatures if the heating elements 54 were directly controlled by the temperature of the atmosphere in the pressure chamber. This problem has been successfully overcome as described above by controlling the heating elements 54 in accordance with the temperature of the inside metal surface of the pressure chamber 12.

Referring now to FIGURE 2, the pressure vessel 12 comprises a generally dish-shaped bottom section 44 having an upwardly projecting annular rim 46 which is threaded around its inner surface 48. A housing 50 is connected to the underside of the vessel section 44 so as to define a chamber which is substantially filled with insulating material 52. Electrical heating elements 54 are positioned within the housing 50 so as to be in substantial engagement with the underside of the bottom section 44 of the pressure vessel 12, and the heating elements are held in position by means of a retainer 56. The retainer 56 is formed with a collar 58 which fits over a collar 60 formed on the pressure vessel section 44 and is secured thereto by a set screw 62. The upper end of the pipe or conduit 16 is threaded into the collar 60 so as to provide a support for the pressure vessel 12, and the housing 50 is formed with a collar 64 which fits over the pipe 16 and is held thereto by a set screw 66.

As shown in FIGURES 2 and 3, there is provided a sample holder 68 comprising a relatively thin disc-shaped plate having a plurality of recesses 70 each of which is intended to retain a sample of paper to be tested. The sample holder 68 is also provided with a central aperture 72, the purpose of which will be described hereinafter. In the embodiment shown in FIGURE 3, it will be seen that the recesses 70 are rectangular in their configuration. Each recess 70 is defined by a rectangular countersunk edge portion 74, and a rectangular opening 76 which extends completely through the sample holder plate for a purpose which will be apparent later herein. FIGURE 4 shows the manner in which a rectangular piece of filter paper 78 is first placed in one of the recesses 70 so as to be supported on the countersunk edge portion 74, and then a sample piece of paper P to be tested is placed on top of the filter paper.

When the sample holder 68 is loaded with samples of paper P to be tested, the holder is placed within the pressure vessel 12. As shown in FIGURE 2, the bottom section 44 of the pressure vessel 12 is provided with an annular ledge 80 surrounded by an annular peripheral rim portion 82. The annular ledge 80 is provided with a plurality of circumferentially spaced holes 84 and in each of the holes there is mounted a spring-loaded pin 86. Each of the pins 86 is biased upwardly by its corresponding spring, and such pins serve to support the sample holder 68 when the latter is positioned within the pressure vessel 12. Thus, the sample holder 68 is positioned within the annular rim portion 82 so as to be supported on the plurality of spring-loaded pins 86, and a sample holder cover 88 is placed on the top of the sample holder so as to overlie the several test samples P and hold the same in position in the recesses 70. The sample holder cover 88 comprises a relatively thin disc-shaped plate having a downwardly projecting circular rim portion 90 at its center. When the sample holder cover 88 is positioned on top of the sample holder 68, the projecting rim 90 is disposed within the aperture 72 formed in the center of the sample holder thereby locating the two members relative to one another.

When the cover 42 is removed from the pressure vessel bottom section 44 it is held above the latter by a compression spring 92 which is disposed on the rod 40 between the top of the cover 42 and the underside of a collar 94, the collar 94 being mounted on the upper end of the rod 40 and serving to carry a handle or cross rod 96. When the sample holder 68 with its cover 88 are disposed in the pressure vessel 12 as shown in FIGURE 2, the handle 96 may be depressed and turned so as to thread the cover 42 into the rim portion 46 of the pressure vessel section 44 and cause the cover to seat against an annular ledge 98 thus defining a sealed interior pressure chamber 100.

It is important to note that the plurality of spring loaded pins 86 bias the sample holder 68 upwardly into engagement with the sample holder cover member 88, and the latter in turn is maintained in engagement with the pressure vessel cover 42. The paper specimens of samples P are themselves in contact with the sample holder 88, and it will thus be understood that when the pressure vessel section 44 is heated by the heating elements 54, the heat will be conducted through the members 42 and 88 directly to the paper samples. Thus, the covers 42 and 88 comprise an effective source of heat which readily flows into the test samples P. It will also be noted that due to the openings 76 formed in the sample holder 68, the pieces of filter paper 78 and the paper samples P which overlie the latter are directly exposed to pressure changes occurring within the pressure chamber 100.

The method of the present invention and the operation of the foregoing apparatus in the performance of such method will now be described. In order to prepare suitable test specimens, a sample of paper to be evaluated for blistering is preferably first subjected for a time to suitable conditions of temperature and humidity, e.g., 73 degrees F. and 50% relative humidity. The sample is then inked on both surfaces, for example by passing the sheet between the nip of an ink applicator roll and an auxiliary rubber brayer. In one specific application of the method of the present invention, the sample sheet was passed four times through the nip, and the surface of the sheet exposed to the brayer was reversed after pass.

In accordance with the method of the present invention the paper sample is dried after the inking operation. For example the samples may be dried for one-half hour in an oven at 65 degrees C. After the drying operation, it is necessary that the paper samples be reconditioned so that they will contain a proper amount of moisture. In other words, it is the conversion of such moisture into steam in an ink-drying oven that is the primary cause of blistering, and in order to reproduce such conditions during a blister test operation it is necessary that the paper samples contain a predetermined moisture content. More specifically, the moisture content of the test paper should be maintained at the maximum level which is likely to be encountered in a commercial print shop. Consequently, after the test samples P are linked and dried, they are conditioned for the purpose of restoring moisture content, and the latter objective can be achieved by reconditioning the specimens under appropriate temperature and humidity conditions, e.g., 73 degrees F. and 50% relative humidity.

After completion of the foregoing operations, a plurality of individual specimens are cut from the inked sample sheet. A certain number of such specimens are reserved for Scott bonding strength determinations, and as will be explained more fully hereinafter, the results of such bonding strength tests may be taken as an indication of the strength of the samples prior to the blistering treatment.

Before the paper samples P to be tested are inserted in the sample holder 68, it is first desirable to mount the pieces of filter paper 78 in the sample holder as shown in FIGURES 2 and 4. Thus, in conjunction with each piece of paper sample P to be tested, there is provided a piece of coarse filter paper 78 which has been soaked in water and blotted until it contains a predetermined amount of water, e.g., 0.3 gram of water for a filter paper measuring 1⅝ x 2⅝ inches. A piece of moistened filter paper is thus positioned on each of the countersunk rim portions 74 so as to overlie each of the oblong openings 76 formed in the sample holder 68. The primary purpose in providing the filter papers 78 is to assist in maintaining the moisture in the paper test samples P during heating of the latter in the pressure vessel 12.

Thus, the inked specimens P are laid over the filter papers 78 as represented in FIGURE 4. Thereafter, as previously described, the sample holder cover 88 is positioned over the specimens P on top of the sample holder 68, the latter assembly is placed in the pressure vessel section 44 as shown in FIGURE 2, and the pressure vessel cover 42 is threaded into the rim portion 46 so as to form the sealed chamber 100. Because of the openings 76 in the sample holder 68, the moist filter papers 78 with the inked samples P directly above them are exposed to conditions in the pressure chamber 100. As indicated above, the presence of the moisture in the filter papers 78 serves to prevent the inked specimens P from losing moisture drying out during the test heating cycle to be described hereinbelow, and the presence of moisture on the surface of each test sample P simulates printing conditions in the offset process where water as well as ink is present on the paper surface when it passes through the print drying oven.

In order to conduct a blistering test on the samples P, an aspirator (not shown) is connected to the conduit 22 and utilized to evacuate the vacuum tank 14 to a predetermined vacuum, e.g., 22 inches of mercury. At this point in the test operation, the valve 18 is closed so that the vacuum tank 14 is sealed off from the pressure vessel 12. The pressure in the pressure vessel 12 is increased by opening the valve 24 and admitting air under pressure to the chamber 100 until the pressure is increased to a suitable predetermined value, while at the same time the electrical heating elements 54 are energized so as to heat the chamber 100 to a predetermined elevated temperature. As an example of suitable conditions of pressure and temperature in the chamber 100, it has been found that highly satisfactory tests can be run where the pressure is increased to approximately 40 p.s.i., and the temperature is increased to approximately 180 to 190 degrees F. FIGURE 1 shows the temperature indicator and control 32, and FIGURE 2 shows a temperature measuring member 102 which is located within the chamber 100 and is operatively connected with the member 32. It will be seen from FIGURE 2 that when the pressure in the chamber 100 is increased as described above, the several test specimens P are firmly supported or backed up by the underside of the sample holder cover 88 while being exposed through the openings 76 to the pressure conditions in the chamber.

After achieving the foregoing temperature and pressure conditions in the pressure vessel 12, the valve 18 (see FIGURE 1) is opened and a vacuum quickly develops in the chamber 100 as the latter is connected with the vacuum tank 14. For example, where the initial vacuum in the tank 14 is approximately 22 inches of mercury, the opening of the valve 18 will produce a vacuum of approximately 19 inches of mercury in the chamber 100, and as a result any moisture within the paper specimens P flashes into steam, thereby creating a relatively severe condition which will develop blistering in blister-prone papers. Thereafter, air is bled into the system so as to break the vacuum, and the paper specimens P are removed for examination and further tests as will be described hereinbelow. It is important to note in connection with the foregoing that the vacuum tank 14 should be substantially larger than the pressure chamber 100. By way of example, I have achieved satisfactory test results using a pressure chamber 100 having a capacity of one liter and a vacuum tank 14 having a capacity of 38 liters, although of course the precise ratio between the two is by no means critical.

It will be understood that various conditions of temperature and pressure may be used in order to vary the degree of blistering which is produced, and as will be discussed more fully later herein, it is also possible to control the severity of the test by varying the rate of vacuum development in the pressure chamber 100. Thus, the specific conditions described above are by way of example only. The important concept on which the present invention is based is that a sample of the paper to be tested is heated at a pressure above the equilibrium vapor pressure of the water in the sample sheet, and then the pressure is reduced to a value below the equilibrium vapor pressure of the water, thereby causing such water to flash into steam.

The object of the foregoing test procedure is to simulate conditions where printed paper is heated at relatively high heating rates for a period of time sufficient to evaporate all of the moisture in the sheet. When the valve 18 is opened so as to suddenly develop a vacuum in the pressure chamber 100, causing the moisture in the paper specimens to flash into steam, the steam will not produce blistering of the paper if it can readily escape through pores in the sheet. On the other hand, if the paper possesses low porosity, either due to ink coverage or due to the characteristics of the sheet itself, then the pressure of the vapor built up in the sheet will rupture fiber bonds and expand the sheet structure so as to produce a blister whenever the pressure of the vapor exceeds the rupture resistance of the paper sheet. The foregoing test procedure has been found to indicate accurately with respect to the paper being tested the likelihood of such paper developing blisters in a print shop during an ink-drying operation.

After completion of the test procedures described above, it is of course necessary to evaluate each sample with respect to the degree of blistering which has occurred. One procedure is simply to make a visual observation of the test sample, or the test sample may be compared visually with certain previously prepared standard specimens which represent various predetermined degrees of blistering. While such procedures may be used to advantage in connection with the present invention, I have developed a more precise procedure based on a comparison of Scott internal bonding strength values of the blistered samples with those obtained with inked samples that have not been subjected to the blistering treatment. As is well known in the art, a Scott bonding strength value indicates the strength or rupture resistance of a sheet of paper in the direction perpendicular to the plane of the sheet, i.e., resistance to delamination. I have found that the Scott bonding strength in the blistered areas is essentially zero, whereas I have found that the bonding strength in the unblistered portions of an inked sample remains substantially unchanged. Accordingly, the ratio of blistered area to total area, or the relative degree of blistering, may be estimated from the following formula:

$$D_B = \frac{S_B - S_A}{S_B} \times 100$$

where:

$D_B$=the relative degree of blistering expressed as a percentage value $S_B$=Scott internal bond strength of inked sample before blistering
$S_A$=Scott internal bond strength after blistering In accordance with the testing procedure described above, several test samples P are treated together in the blister tester 10. After the test, such samples are conditioned at predetermined values of temperature and relative humidity, e.g. 73 degrees F. and 50% relative humidity, after which the specimens may be cut into smaller sections and tested in a Scott bond tester. Similar samples of inked specimens which were not treated in the blister tester 10 are also provided to supply values for $S_B$.

A further advantage of the method and apparatus of the present invention is that it is readily possible to control the severity of the blistering test by varying the rate at which the vacuum is developed in the pressure chamber 100, and this can be accomplished by varying the size of the opening in the conduit 16 which connects the pressure chamber 100 with the vacuum tank 14. Referring, for example, to FIGURE 2, the pressure vessel section 44 is provided at its base with an opening 104 which communicates with the conduit 16, and there is formed therein a counter-sunk annular ledge 106 on which is seated an orifice plate 108 having a central orifice 110. The orifice 110 is smaller than the opening 104, and it will be understood that various orifice plates having different sizes of orifices formed therein may be substituted for one another in order to provide a selected orifice 110 of predetermined size.

As the size of the orifice 110 is reduced, it is possible to reduce the rate at which a vacuum develops in the pressure chamber 100 upon opening of the valve 18, thereby reducing the severity of the blister treatment on the paper specimens P. By using the foregoing procedure it is possible to set up standards for various papers for the control of mill production. This can be accomplished by prescribing use of a predetermined orifice plate 108 for use in testing a specific grade of paper. The size of the orifice 110 is selected to control the severity of the test so that if the paper is satisfactory then no blistering will occur, in which case the paper is rejected on the basis of visual blisters, and a detailed determination of the relative degree of blistering is not necessary.

The method and apparatus of the present invention have been found to offer numerous advantages over blister test procedures heretofore known. Because of the substantially instantaneous flashing of the moisture in the paper into steam, there is provided a relatively severe test which can more readily distinguish between papers having different blistering tendencies and can function effectively over a wider range of papers. Moreover, the method of the present invention has been found to be quite accurate in providing test results which correlate with commercial experience in the print shop and eliminate discrepancies in other testing procedures.

Other types of apparatus heretofore known such as the infrared heat lamps can produce burning or scorching of the paper specimens so that their physical characteristics will be changed even in the absence of blistering. On the other hand, I have found that specimens subjected to the blister test of the present invention will not be significantly affected by the test if blisters are not produced. This is particularly true with respect to Scott internal bonding strength values, and thus permits use of the Scott bond test to provide a quantitative determination of relative blistering tendencies, i.e., relative degree of blistering of test samples. The present invention has therefore been found to be extremely useful both as a means of predicting blistering tendencies in print shops and also as a tool to assist in developing specifications for blister resistant papers.

While I have described my invention in certain preferred forms, I do not intend to be limited to such forms, except insofar as the appended claims are so limited, since modifications coming within the scope of my invention will readily occur to those skilled in the art, particularly with my disclosure before them.

I claim:

1. A method of testing printing paper for blistering characteristics comprising heating a sample of the paper while maintaining a pressure above the equilibrium vapor pressure of moisture in the paper, and thereafter reducing the pressure to a value below the equilibrium vapor pressure of the moisture, thereby causing the moisture in the sheet to flash into steam and thus create a condition tending to produce blistering in a blister-prone paper.

2. The method of claim 1 where ink is applied to the sample of paper before the latter is heated under pressure.

3. The method of claim 2 where the sample of paper is dried after application of ink thereto and is then reconditioned to increase its moisture content before the sample is heated under pressure.

4. The method of claim 3 where ink is applied to both sides of the sample.

5. A method of testing printing paper for blistering characteristics comprising applying ink to a sample of the paper, drying the sample after application of ink thereto, reconditioning the sample to increase its moisture content after the drying thereof, heating the sample while maintaining a pressure substantially above atmospheric pressure, and thereafter quickly subjecting the sample to a vacuum thereby causing the moisture in the sample to flash into steam and thus create a condition tending to produce blistering in a blister-prone paper.

6. The method of claim 5 where a bonding strength measurement is made on a first sample after the sample has been subjected to the blister test, a bonding strength measurement is also made on a second similar inked sample which has not been subjected to a blister test, and where the two bonding strength measurements are compared in order to provide a quantitative measurement as to the degree of blistering of said first sample.

7. The method of claim 6 where said two bonding strength measurements are obtained by means of a Scott bond test and are compared to produce said quantitative measurement in accordance with the following formula:

$$D_B = \frac{S_B - S_A}{S_B} \times 100$$

where:
$D_B$=the relative degree of blistering of the first sample expressed as a percentage value
$S_B$=Scott internal bond strength of second sample not subject to a blister test
$S_A$=Scott internal bond strength of first sample after development of blistering in a blister test.

8. The method of claim 5 including the step of varying the rate at which said vacuum is produced in order to vary the severity of the blister test.

9. A method of testing printing paper for blistering characteristics comprising heating a sample of the paper in a closed chamber to a predetermined temperature, supplying air under pressure to said chamber to produce therein a predetermined pressure above the equilibrium vapor pressure of moisture in the paper, and thereafter operatively connecting said chamber to a vacuum source thereby causing moisture in the sample to flash into steam and thus create a condition tending to produce blistering in a blister-prone paper.

10. The method of claim 9 where said sample is firmly supported on one side while the opposite side thereof is in effect exposed to pressure changes within said chamber.

11. A method of testing printing paper for blistering characteristics comprising applying ink to both sides of a sample of the paper, drying the sample after application of ink thereto, reconditioning the sample to increase its moisture content after the drying thereof, heating the sample in a closed chamber to a predetermined temperature, supplying air under pressure to said chamber to produce therein a predetermined pressure above the equilibrium vapor pressure of moisture in the paper, and thereafter operatively connecting said chamber to a vacuum source so as to rapidly produce a vacuum in said chamber thereby causing moisture in the sample to flash into steam and thus create a condition tending to produce blistering in a blister-prone paper.

12. Apparatus for testing printing paper for blistering characteristics comprising, in combination, a pressure chamber, a sample holder removably disposed within said pressure chamber for holding a sample of paper to be tested, heating means for heating said pressure chamber to a predetermined temperature, a source of air under pressure connected with said pressure chamber, a vacuum tank connected with said pressure chamber, said vacuum tank having a substantially larger volume than said pressure chamber, and valve means between said pressure chamber and said vacuum tank for opening and closing the connection therebetween.

13. The invention of claim 12 including means for varying the size of an opening in the connection between said vacuum tank and said pressure chamber.

14. The invention of claim 12 where said sample holder includes a recess for holding a sample and where a removable sample holder cover overlies said sample to retain the same in said recess and also serve as a source of heat for said sample, said sample holder having an opening therein aligned with said recess to permit said sample to be exposed to pressure changes in said pressure chamber.

References Cited

UNITED STATES PATENTS 3,292,418  12/1966  Oehme et al. _____ 73—15

JAMES J. GILL, Primary Examiner

HERBERT GOLDSTEIN, Assistant Examiner

U.S. Cl. X.R.

34—23, 41, 148; 73—150; 162—198